United States Patent [19]
Solberg

[11] Patent Number: 5,559,919
[45] Date of Patent: Sep. 24, 1996

[54] PHOTOELECTRIC OPTICAL FIBER CONNECTOR AND SENSOR APPARATUS

[75] Inventor: Jeffry W. Solberg, Snohomish, Wash.

[73] Assignee: Eaton Corporation, Cleveland, Ohio

[21] Appl. No.: 449,993

[22] Filed: May 25, 1995

[51] Int. Cl.$^6$ .................................. G02B 6/36; G01J 1/04
[52] U.S. Cl. ........................... 385/92; 385/12; 385/31; 385/39; 385/49; 385/52; 385/76; 385/77; 385/88; 385/89; 250/227.11; 250/227.14
[58] Field of Search .................... 385/14, 24, 12, 385/31, 39, 49, 51, 52, 76, 77, 88, 89, 92, 94; 250/227.11, 227.14

[56] References Cited

U.S. PATENT DOCUMENTS

| | | | |
|---|---|---|---|
| 3,064,128 | 11/1962 | Duke | 250/227.11 X |
| 4,118,105 | 10/1978 | Voigt | 385/92 X |
| 4,158,310 | 7/1979 | Ho | 73/705 |
| 4,468,567 | 8/1984 | Sasano et al. | 385/12 X |
| 4,727,248 | 2/1988 | Meur et al. | 250/227.11 X |
| 4,767,168 | 8/1988 | Grandy | 385/88 X |
| 4,778,990 | 10/1988 | Laughlin | 385/12 X |
| 4,812,003 | 3/1989 | Damach et al. | 385/12 X |
| 4,909,588 | 3/1990 | Harner et al. | 385/12 X |
| 4,988,155 | 1/1991 | Harner et al. | 250/227.11 X |
| 5,109,453 | 4/1992 | Edwards et al. | 385/90 |
| 5,109,454 | 4/1992 | Okuno et al. | 385/92 |
| 5,231,686 | 7/1993 | Rabinovich | 385/93 |
| 5,239,605 | 8/1993 | Shimada | 385/88 |
| 5,329,604 | 7/1994 | Baldwin et al. | 385/92 |
| 5,402,508 | 3/1995 | O'Rourke et al. | 385/91 |

OTHER PUBLICATIONS

"Photoelectric Sensors–Smarteye® Models", Section 3, pp. 3–2 and 3–4, publication date unknown but prior to Jan. 1, 1995.

*Primary Examiner*—Brian Healy
*Attorney, Agent, or Firm*—Tarolli, Sundheim, Covell, Tummino & Szabo

[57] ABSTRACT

A photoelectric sensor apparatus includes a basic sensor having a housing which encloses a light source and a photodetector. An adapter assembly is provided to connect fiber optic cables with the basic sensor. The adapter assembly includes an adapter having a head end portion which extends across an end face of the housing of the basic sensor. In addition, the adapter has legs which extend along flat side surfaces of the housing. A gasket is disposed between an inner side of the head end portion of the adapter and the housing of the basic sensor to provide a fluid tight seal between the adapter and the housing and between the gasket and the fiber optic cables. A nut engages an external thread convolution on the housing. The nut applies force against end portions of the legs of the adapter to hold the adapter against the gasket and compress the gasket between the housing and the adapter. Retainer elements, such as set screws, are provided in the head portion of the adapter to hold the fiber optic cables in place.

14 Claims, 3 Drawing Sheets

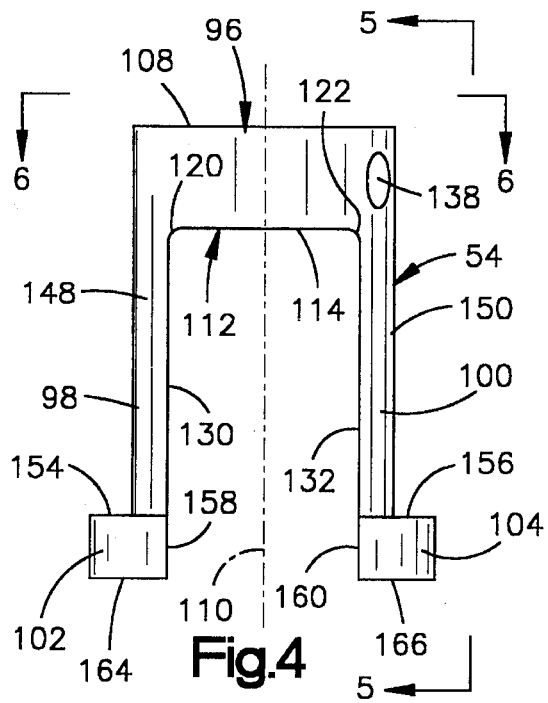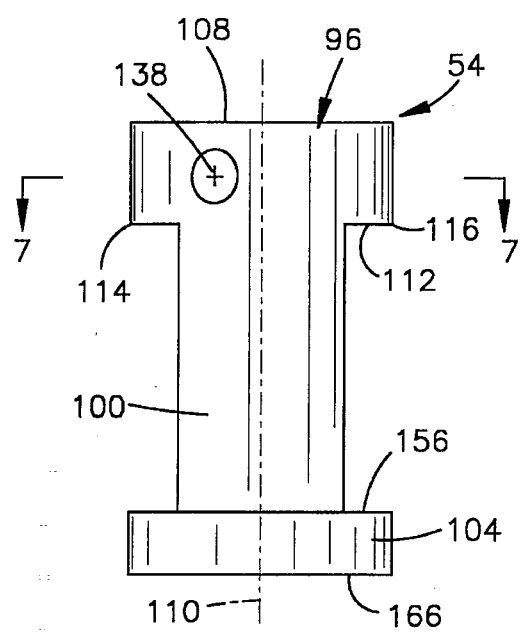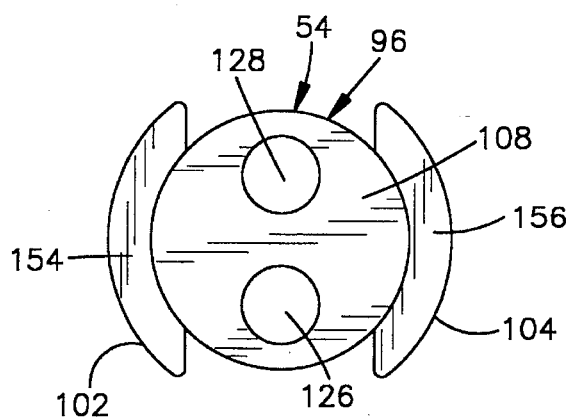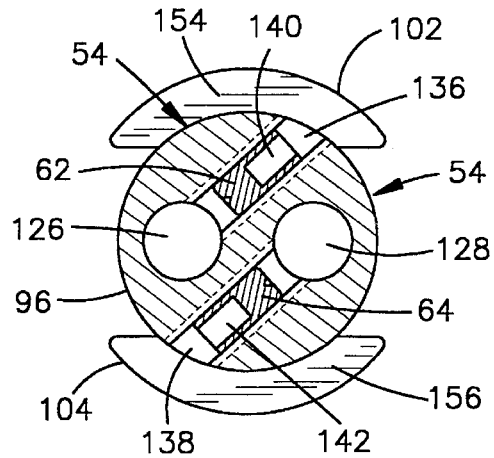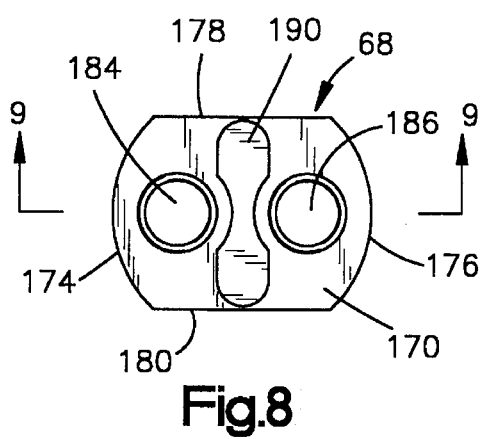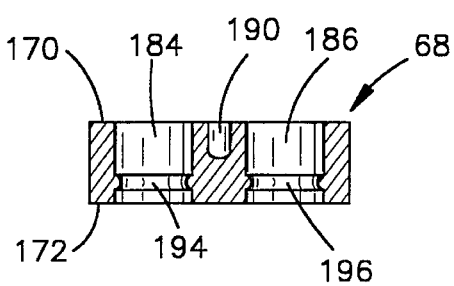

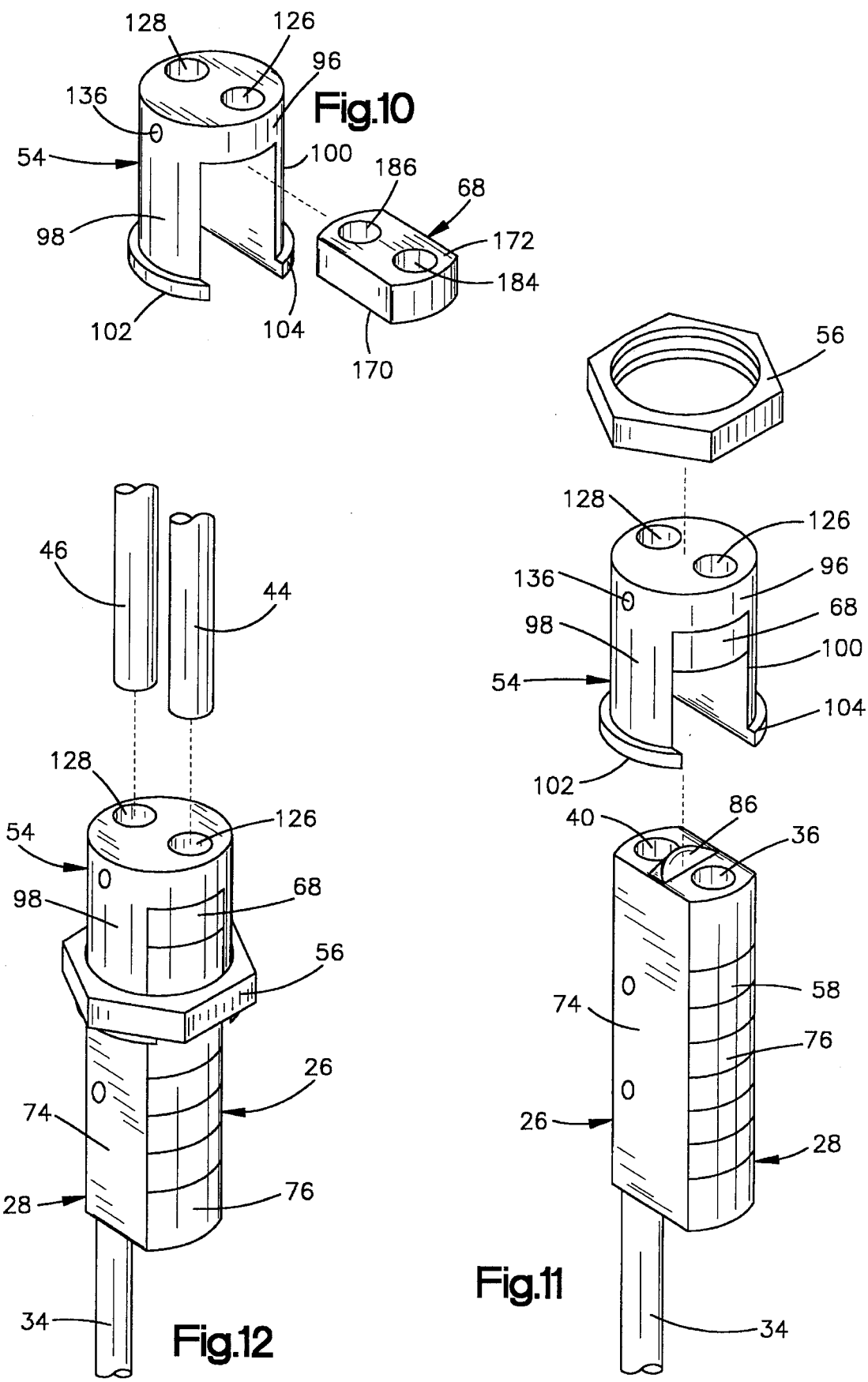

PHOTOELECTRIC OPTICAL FIBER CONNECTOR AND SENSOR APPARATUS

BACKGROUND OF THE INVENTION

The present invention relates to a photoelectric sensor apparatus, and, more specifically, to an adapter assembly which is used to connect fiber optic cables with a basic photoelectric sensor.

A known basic photoelectric sensor includes a housing which encloses a light source and a photodetector. Light from the light source is transmitted through a transparent outlet from the housing to an article to be detected. Light reflected from the article is transmitted through an inlet to the housing to the photodetector. Although the basic photoelectric sensor is satisfactory in its mode of operation, there are situations in which it is difficult to use the basic photoelectric sensor. These situations include situations in which space is restricted, temperatures are high, and/or tight viewing angles are required.

SUMMARY OF THE INVENTION

The present invention provides an adapter assembly which is used to attach fiber optic cables with a basic photoelectric sensor. By attaching fiber optic cables to the basic photoelectric sensor, the basic photoelectric sensor can be used in situations in which space is restricted, temperatures are high, and/or tight viewing angles are required.

The adapter assembly includes an adapter having a head end portion which extends across an end face of a housing of the basic photoelectric sensor. The adapter may have legs which extend outward from the head end portion along side surfaces of the housing of the basic adapter. An internally threaded member may engage an external thread on the housing of the basic sensor and engages projections on the legs of the adapter to urge the head end portion of the adapter toward the end face of the housing. Fiber optic cables extend through passages in the head end portion of the adapter to the end face of the housing.

BRIEF DESCRIPTION OF THE DRAWINGS

The foregoing and other features of the present invention will become more apparent upon a consideration of the following description taken in connection with the accompanying drawings, wherein:

FIG. 4 an enlarged side elevational view, taken generally along the line 4—4 of FIG. 2, illustrating the adapter member;

FIG. 5 is a side elevational view, taken generally along the line 5—5 of FIG. 4, further illustrating the adapter member;

FIG. 6 is a top plan view, taken generally along the line 6—6 of FIG. 4, further illustrating the adapter member;

FIG. 7 is a sectional view, taken generally along the line 7—7 of FIG. 5, illustrating the relationship of a pair of retainer members disposed in a head end portion of the adapter member;

FIG. 8 is a plan view, taken generally along the line 8—8 of FIG. 2, illustrating a gasket which is pressed against the basic sensor by the adapter member;

FIG. 9 is a sectional view, taken generally along the line 9—9 of FIG. 8, further illustrating the construction of the gasket;

FIG. 10 is a schematic illustration depicting the manner in which the gasket is inserted into the adapter member;

FIG. 11 is a schematic illustration depicting the manner in which the adapter member and gasket are positioned relative to the housing of the basic sensor; and FIG. 12 is a schematic illustration depicting the manner in which fiber optic cables are connected with the adapter member and the basic sensor.

DESCRIPTION OF ONE SPECIFIC PREFERRED EMBODIMENT OF THE INVENTION

General Description

Figure 1:
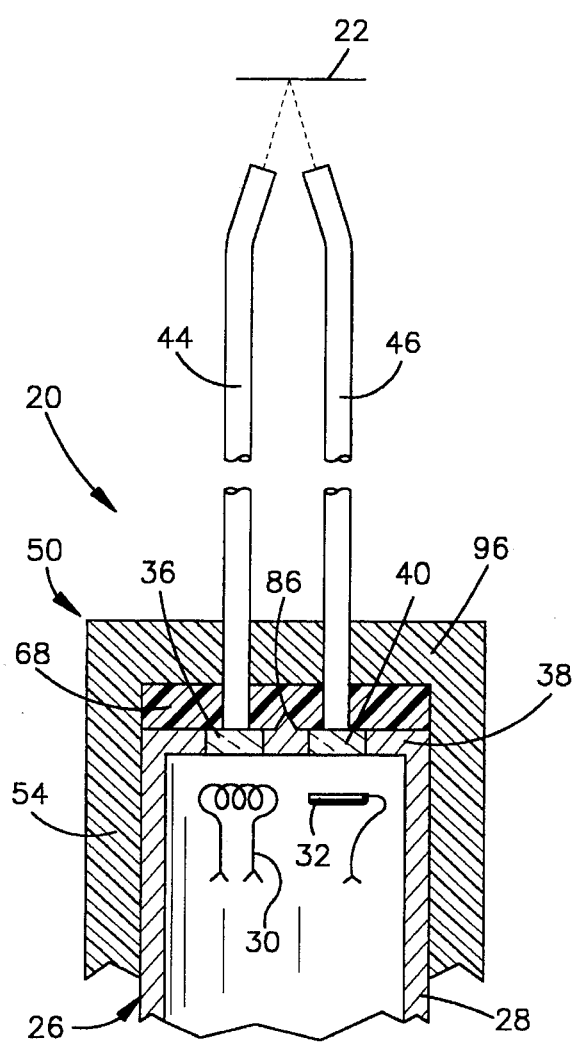
FIG. 1 is a schematic illustration depicting the use of an adapter assembly constructed in accordance with the present invention to connect a pair of fiber optic cables with a housing of a known basic sensor.
Figure 2:
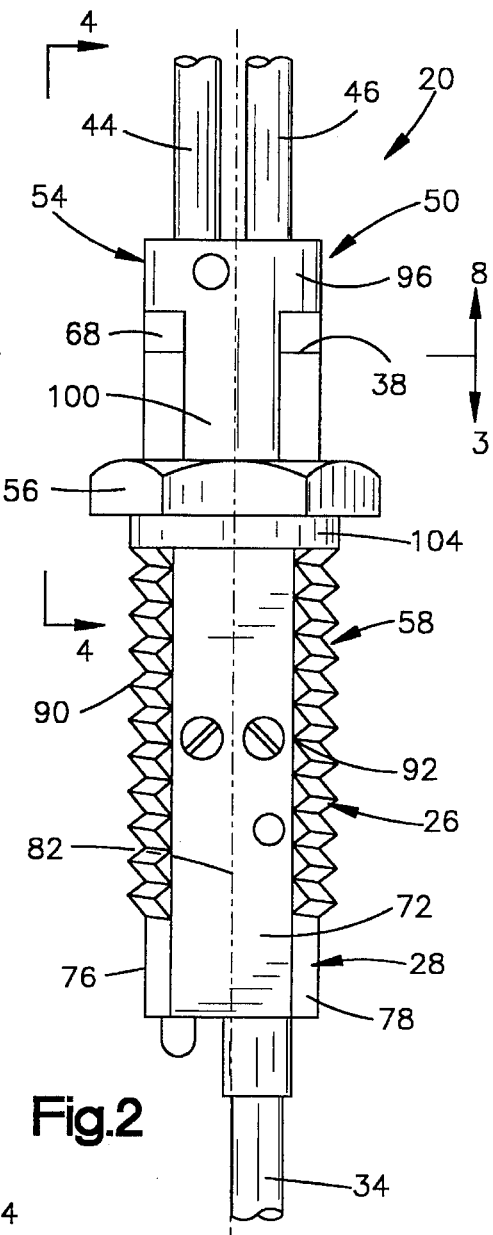
FIG. 2 is a side elevational view illustrating the manner in which the adapter assembly is utilized to connect a pair of fiber optic cables with a housing of the basic sensor.

A photoelectric sensor apparatus 20 constructed in accordance with the present invention, is illustrated schematically in FIG. 1. One specific embodiment of the photoelectric sensor apparatus 20 of FIG. 1 is illustrated in FIG. 2. The photoelectric sensor apparatus 20 is used to detect the presence of an object 22 (FIG. 1) at a remote location.

The photoelectric sensor apparatus 20 includes a basic sensor 26 having a metal or polymeric (polyurethane) housing 28 which encloses a light source 30 and a photodetector 32 (FIG. 1). The light source 30 is energized by electrical energy conducted through a conductor 34 (FIG. 2) Light from the light source 30 (FIG. 1) is transmitted through a transparent outlet 36 in an end face 38 of the housing 28. Light is conducted to the photodetector through a transparent inlet 40 in the end face 38 of the housing 28. The basic sensor 26 can be used to sense objects 22 which are relatively a short distance from the housing 28.

The basic sensor 26 can be adapted to detect objects 22 at a greater distance from the housing 28 through the use of a pair of fiber optic cables 44 and 46. The fiber optic cable 44 conducts light transmitted from the light source 30 through the outlet 36 in the end face 38 of the housing to a remote location where the object 22 is located. The fiber optic cable 46 conducts light reflected from the object 22 to the transparent inlet 40 and the photodetector 32 in the housing 28.

An adapter assembly 50, constructed in accordance with a feature of the present invention, is used to connect the fiber optic cables 44 and 46 with the housing 28 of the basic sensor 26. The adapter assembly 50 aligns the fiber optic cable 44 with the outlet 36 from the housing 28. In addition, the adapter assembly 50 aligns the fiber optic cable 46 with the inlet 40 to the housing 28. Although the basic sensor 26 can be used to detect objects 22 at a relatively short range, by connecting the fiber optic cables 44 and 46 to the basic sensor 26 with the adapter assembly 50, the basic sensor can be used to detect objects which are a substantial distance away from the basic sensor. In addition, the use of the fiber optic cables 44 and 46 enables the basic sensor 26 to be used in situations where space is restricted, temperatures are high, and/or tight viewing angles are required.

The adapter assembly 50 includes a one-piece adapter member 54 (FIGS. 2, 4, 5, and 6). The adapter member 54 is connected with the housing 28 of the basic sensor 26 by an internally threaded member or nut 56 (FIG. 2). The nut 56 10 has a helical internal thread convolution which engages a helical external thread convolution 58 on the housing 28.

The fiber optic cables 44 and 46 are connected with the adapter member 54 by a pair of retainer members 62 and 64 (FIG. 7). Although many different types of retainer members could be used to retain the fiber optic cables in the adapter member 54, in the illustrated embodiment of the invention, the retainer members 62 and 64 are set screws.

A gasket 68 (FIGS. 2, 8 and 9) is compressed between the adapter member 54 (FIG. 2) and the end face 38 of the housing 28. The gasket 68 seals joints between the adapter member 54, end face 38 of the housing 28, and fiber optic cables 44 and 46. The gasket 68 provides an optical seal to prevent light from the source 30 from directly reaching the sensor 26 and locking the sensor in the on state.

Housing

Figure 3:
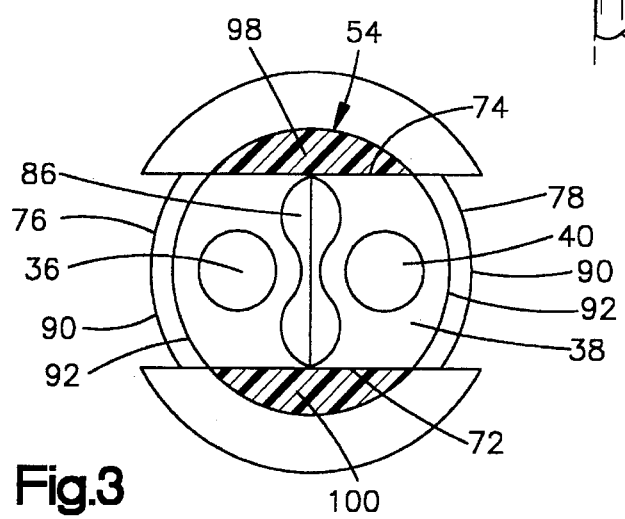
FIG. 3 is a plan view, taken generally along the line 3—3 of FIG. 2, with components omitted, illustrating the relationship between a housing of the basic sensor and an adapter member in the adapter assembly.

The basic sensor 26 includes a tubular metal or polymeric (polyurethane) housing 28 (FIG. 2) which encloses the light source 30 and photodetector 32 (FIG. 1). The housing 28 has a pair of flat parallel outer side surfaces 72 and 74 (FIG. 3). Arcuate outer side surfaces 76 and 78 extend between the flat outer side surfaces 72 and 74. The center of curvature of the arcuate outer side surfaces 76 and 78 is disposed on a longitudinal central axis 82 (FIG. 2) of the housing 28 and basic sensor 26.

The end face 38 of the sensor housing 28 extends perpendicular to the central axis 82 of the sensor housing and contains the transparent outlet 36 (FIG. 1) and inlet 40 through which light is transmitted. The transparent inlet 36 and outlet 40 (FIG. 3) have central axes which extend parallel to the central axis 82 of the housing 28 and are offset in opposite directions from the central axis 82 of the housing 28 by the same distance. A rib 86 projects axially outwardly from the end face 38 (FIG. 3) and is disposed midway between the outlet 36 and inlet 40.

The rib 86 impedes the direct transfer of light between the outlet 36 and the inlet 40 when the basic sensor 26 is used without the fiber optic cables 44 and 46. The rib 86 has a longitudinal central axis which extends perpendicular to and intersects the longitudinal central axis 82 of the housing 28. The longitudinal central axis of the rib 86 is disposed equal distances from central axes of the outlet 36 and inlet 40 in the end face 38 of the housing and extends perpendicular to these axes.

The helical external thread convolution 58 is formed in the arcuate outer sides 76 and 78 of the housing 28. Each turn of the helical external thread convolution 58 is interrupted at the flat outer side surfaces 72 and 74 on the housing 28 and is then continued in the opposite arcuate outer side of the housing. For example, one turn of the thread convolution 26 is partially formed in the arcuate outer side 76 of the housing 28, is interrupted at the flat outer side surface 72, and is continued in the arcuate outer side 78 of the housing. The external thread convolution 58 may be considered as originally being formed on a cylindrical member which is subsequently cut away to form the flat parallel side surfaces 72 and 74. Of course, the helical external thread convolution 58 could also be considered as being formed on a tubular member in which the flat sides 72 and 74 are initially formed and then the helical external thread convolution is cut in the arcuate sides 76 and 78 of the member. The helical external thread convolution 58 has an arcuate crest or outer diameter 90 and an arcuate root or inner diameter 92 (FIGS. 2 and 3).

Adapter Member

The generally cylindrical adapter member 54 (FIGS. 4, 5 and 6) has a head end portion 96. A pair of parallel legs 98 and 100 extend outwardly from the head end portion 96. The legs 98 and 100 have radially outwardly extending projections 102 and 104. The adapter member 54 is integrally molded as a single piece of polymeric material, specifically, "DELRIN" (trademark). However, it may be preferred to form the adapter member 54 from brass or similar material to provide additional strength.

The head end portion 96 of the adapter member 94 has a flat circular outer side surface 108 which extends perpendicular to a longitudinal central axis 110 of the adapter member 54. A flat inner side surface 112 (FIG. 4) on the head end portion 96 extends parallel to the flat outer side surface 108. The flat inner side surface 112 has opposite arcuate edge portions 114 and 116 (FIG. 5) which extend between the legs 98 and 100. The arcuate edge portions 114 and 116 are formed as a portion of a circle having the same diameter as the flat outer side surface 108 on the head end portion 96. The flat inner side surface 112 has straight parallel edge portions 120 and 122 (FIG. 4) formed at corners where the legs 98 and 100 extend outward from the head end portion 96. The straight edge portions 120 and 122 of the inner side surface 112 extend between the arcuate edge portions 114 and 116.

A pair of cylindrical passages 126 and 128 (FIG. 6) extend through the head end portion 96 and are sized so as to receive the fiber optic cables 44 and 46. The passages 126 and 128 have parallel central axes. The central axes of the passages 126 and 128 extend parallel to the central axis 110 of the adapter 54.

The central axes of the passages 126 and 128 are disposed in a plane located midway between and extending parallel to flat inner side surfaces 130 and 132 (FIG. 5) on the legs 98 and 100. The central axes of the passages 126 and 128 are spaced equal distances from a plane extending through the central axis 110 of the adapter member 54 and perpendicular to the flat inner side surfaces 130 and 132 of the legs 98 and 100. The central axes of the passages 126 and 128 are spaced the same distance apart as are the central axes of the outlet 36 and inlet 40 (FIG. 1) formed in the end face 38 of the housing 28.

The retainer members 62 and 64 (FIG. 7) are disposed in cylindrical passages 136 and 138 which intersect the passages 126 and 128. The retainer passages 136 and 138 have longitudinal central axes which extend perpendicular to and intersect the central axes of the passages 126 and 128.

In the illustrated embodiment of the invention, the retainer members 62 and 64 are set screws having external thread convolutions which engage internal thread convolutions formed in the side walls of the passages 136 and 138. The set screws 62 and 64 have hexagonal sockets 140 and 142 which receive a suitable tool, such as an Allen wrench. Although the retainers 62 and 64 are set screws in the illustrated embodiment of the invention, it is contemplated that other known types of retainers could be used to hold the fiber optic cables 44 and 46 (FIG. 2) in the adapter member 54.

The legs 98 and 100 are formed as extensions of the head end portion 96 of the adapter member 54 (FIG. 4). The legs 98 and 100 have parallel longitudinal central axes which extend parallel to the central axis 110 of the adapter member 54. The longitudinal central axes of the legs 98 and 100 extend parallel to the central axes of the cylindrical passages 126 and 128 (FIG. 6) in the head end portion 96. In addition, the longitudinal central axes of the legs 98 and 100 extend parallel to the flat inner side surfaces 130 and 132 on the legs 98 and 100.

The legs 98 and 100 have arcuate outer side surfaces 148 and 150 which are formed as a portion of a cylinder having the same diameter as the cylindrical head end portion 96 of the adapter member 94. Thus, the cylindrical outer side surfaces 148 and 150 on the legs 98 and 100 are formed as a continuation of a cylindrical outer side surface of the head end portion 96. The arcuate outer side surfaces 148 and 150 on the legs 98 and 100 form portions of a cylinder having a diameter which is the same as the diameter of the root 92 (FIGS. 2 and 3) of the helical external thread convolution 58.

Arcuate end portions or projections 102 and 104 (FIGS. 4 and 6) extend radially outward from the legs 98 and 100. The projections 102 and 104 have flat side surfaces 154 and 156 disposed in a plane which extends perpendicular to the longitudinal central axis 110 of the adapter member 54, that is, in a radial plane. The projections 102 and 104 have flat inner side surface areas 158 and 160 (FIG. 4) which are formed as a continuation of the flat side surfaces 130 and 132 on the legs 98 and 100. The projections 102 and 104 have flat lower side surfaces 164 and 166 which extend parallel to the flat upper side surfaces 154 and 156.

Gasket

The gasket 68 (FIGS. 8 and 9) seals joints between the adapter member 54, the housing 28, and the fiber optic cables 44 and 46 (FIG. 2). The gasket 68 has the same overall configuration as the flat inner side surface 112 on the head end portion 96 of the adapter member 54. The gasket 68 has parallel flat major side surfaces 170 and 172 (FIGS. 8 and 9).

The flat major side surface 170 on the gasket 68 abuts the end face 38 on the housing 28 (FIGS. 1 and 2). The flat major side surface 172 of the gasket 68 abuts the flat inner side surface 112 (FIGS. 4 and 5) on the head end portion 96 of the adapter member 54. The gasket 68 has arcuate minor side surfaces 174 and 176 (FIG. 8) which are formed as a portion of a cylinder having the same diameter as the head end portion 96 of adapter member 54. The gasket 68 has flat parallel minor side surfaces 178 and 180 which are spaced apart by the same distance as the flat side surfaces 130 and 132 on the legs 98 and 100 (FIG. 4).

Cylindrical openings 184 and 186 (FIG. 9) extend through the gasket 68. The cylindrical openings 184 and 186 have central axes which are spaced apart by the same distance as are the central axes of the passages 126 and 128 which extend through the head end portion 96 of the adapter member. The central axes of the openings 184 and 186 which extend through the gasket 68 are also spaced apart by the same distance as the central axes of the outlet 36 and inlet 38 (FIGS. 1 and 3) in the housing 28.

A recess 190 (FIGS. 8 and 9) is disposed midway between the openings 184 and 186 and has a longitudinal central axis which extends perpendicular to the flat side surfaces 178 and 180 on the gasket 68 (FIG. 8). The recess 190 has a configuration which corresponds to the configuration of the rib 86 (FIG. 3) formed on the end face 38 of the housing 28.

A pair of annular seal ridges 194 and 196 (FIG. 9) are formed in the openings 184 and 186. The annular seal ridges 194 and 196 have an inside diameter which is slightly less than the outside diameter of the fiber optic cables 44 and 46. This allows the seal ridges 194 and 196 to engage the outer side surfaces of the fiber optic cables 44 and 46 and form fluid tight seals with the fiber optic cables.

Connecting Fiber Optic Cables With Housing

When it is desired to use the basic sensor 26 (FIG. 2) with the fiber optic cables 44 and 46, the gasket 68 is inserted into the adapter 54 in the manner indicated schematically in FIG. 10. As the gasket 68 is inserted into the adapter 54, the flat end surface 172 on the gasket 68 faces upward toward the head end portion 96 of the adapter 54. The gasket 68 is slid into the space between the legs 98 and 100 (FIGS. 4 and 10) of the adapter 54. As this is done, the flat side surfaces 178 and 180 on the gasket 68 slide along the flat side surfaces 130 and 132 on the inside of the legs 98 and 100. The flat major side surface 172 on the gasket 68 is manually pressed against the flat inner side surface 114 on the head end portion 96 of the adapter 54.

Once the adapter 54 and gasket 68 have been assembled in the manner indicated schematically in FIG. 10, the adapter and gasket are positioned on the housing 28 of the basic sensor 26. To accomplish this, the legs 98 and 100 are aligned with the flat side surfaces 72 and 74 (FIG. 3) on the housing 28. The adapter is then telescoped over the upper (as viewed in FIG. 11) end portion of the housing. As this occurs, the flat inner side surfaces 130 and 132 on the legs 98 and 100 (FIG. 4) of the adapter 54 slide along the flat outer side surfaces 72 and 74 on the housing 28. As the adapter 54 moves downward (as viewed in FIG. 11) on the housing 28, the rib 86 (FIG. 3) on the end face 38 of the housing moves into engagement with the recess 190 (FIG. 8) in the gasket 68. The lower major side surface 170 of the gasket 68 is then pressed against the end face of the housing.

After the adapter member 54 has been positioned over the end of the housing 28, the nut 56 is threaded onto the external thread convolution 58 on the housing. As the nut 56 is threaded onto the housing 28, the lower (as viewed in FIGS. 11 and 12) side of the nut 58 moves into abutting engagement with the upper side surfaces 154 and 156 on the projections 102 and 104 (FIGS. 4 and 6) on the adapter member 58. Force applied by the nut 56 against the projections 102 and 104 on the adapter member 54 pulls the adapter member axially downward onto the housing and compresses the gasket 68 between the end face 38 of the housing and the head end portion 96 of the adapter member. At this time, the helical internal thread convolution on the nut 56 engages the portions of the helical external thread convolution 58 formed on the arcuate sides 76 and 78 of the housing 28. The crest of the helical internal thread convolution on the nut 58 engages the arcuate outer side surfaces 148 and 150 on the legs 98 and 100 of the adapter member 54 to press the legs firmly against the flat side surfaces 72 and 74 on the housing 28.

The fiber optic cables 44 and 46 are then inserted into the passages 126 and 128 in the adapter member 54 in the manner indicated schematically in FIG. 12. Prior to insertion of the fiber optic cables 44 and 46 into the adapter member 54, the passages 126 and 128 in the adapter member were aligned with the openings 184 and 186 in the gasket 68. In addition, the passages 126 and 128 in the adapter 54 were aligned with the outlets 36 and inlet 40 for the housing 28. Therefore, the fiber optic cable 44 can be inserted through the passage 126 in the adapter member 54 and through the opening 184 in the gasket 68 into engagement with the transparent material of the outlet 36 (FIG. 1) from the housing 28. Similarly, the fiber optic cable 46 can be inserted through the passage 128 in the adapter member and the opening 186 in the gasket 68 into engagement with the transparent material of the outlet 40 from the housing 28.

The annular seal ridges 194 and 196 (FIG. 9) in the gasket 68 engage the fiber optic cables 44 and 46 to form fluid tight seals between the fiber optic cables and the gasket. The lower or inner side surface 170 of the gasket 68 engages the end face 38 of the housing 28 to form a fluid tight seal with the housing. The upper or outer side surface 172 of the gasket 68 engages the inner side surface 112 on the head end portion 96 of the adapter member 54 to form a fluid tight seal between the adapter member and the gasket.

Once the fiber optic cables 44 and 46 have been inserted into the adapter member 54 in the manner indicated schematically in FIG. 12, the set screws 62 and 64 (FIG. 7) are tightened to press against the fiber optic cables 44 and 46 and retain them in the adapter member 54. Once this has been done, the photoelectric sensor apparatus 20 is ready to be installed in an environment where the photoelectric sensor apparatus is to be used to detect an object 22. The housing 28 may be mounted in an opening in a bracket and a second nut used to engage the helical external thread convolution 58 and press the extensions 102 and 104 on the adapter member 54 against the bracket. The fiber optic cables 44 and 46 can be positioned so that they have a desired spatial relationship with the remote location where the object 22 is to be detected.

Conclusion

In view of the foregoing description, it is apparent that a photoelectric sensor apparatus 20 constructed in accordance with the present invention includes an adapter assembly 50 which is used to attach fiber optic cables 44 and 46 with a basic photoelectric sensor 26. By attaching fiber optic cables 44 and 46 to the basic photoelectric sensor 26, the basic photoelectric sensor can be used in situations in which space is restricted, temperatures are high, and/or tight viewing angles are required.

The adapter assembly 50 includes an adapter 54 having a head end portion 96 which extends across an end face 38 of a housing 28 of the basic photoelectric sensor 26. The adapter 54 has legs 98 and 100 which extend outward from the head end portion 96 along side surfaces 72 and 74 of the housing 28 of the basic adapter 26. An internally threaded member 56 engages an external thread 58 on the housing 28 of the basic sensor 26 and engages projections 102 and 104 on the legs 98 and 100 of the adapter 54 to urge the head end portion 96 of the adapter toward the end face 38 of the housing. Fiber optic cables 44 and 46 extend through passages 126 and 128 in the head end portion 96 of the adapter 54 to the end face 38 of the housing 28.

Having described the invention, the following is claimed:

1. A photoelectric sensor apparatus comprising a housing enclosing a light source and a photodetector, said housing having an end face with an outlet through which light is conducted from said light source and an inlet through which light is conducted to said photodetector, an adapter, said adapter having a head end portion which extends across said end face of said housing, a connector which interconnects said adapter and said housing, first surface means defining a first passage extending through said head end portion of said adapter, said first passage being axially aligned with said outlet in said end face of said housing, second surface means defining a second passage extending through said head end portion of said adapter, said second passage being axially aligned with said inlet in said end face of said housing, a first fiber optic cable extending into said first passage and engaging said outlet in said end face of said housing to conduct light transmitted from said light source through said outlet in said end face of said housing to a location spaced from said housing, and a second fiber optic cable extending into said second passage and engaging said inlet in said end face of said housing to conduct light from the location spaced from said housing to said inlet in said end face of said housing and said photodetector.

2. A photoelectric sensor apparatus as set forth in claim 1 further including a first retainer disposed in said head end portion of said adapter and engageable with said first fiber optic cable to retain an end portion of said first fiber optic cable in said head end portion of said adapter, and a second retainer disposed in said head end portion of said adapter and engageable with said second fiber optic cable to retain an end portion of said second fiber optic cable in said head end portion of said adapter.

3. A photoelectric sensor apparatus as set forth in claim 1 further including a gasket disposed between said end face of said housing and said head end portion of said adapter, said gasket being resiliently compressed against said end face of said housing by said head end portion of said adapter under the influence of force transmitted from said connector to said head end portion of said adapter, said gasket having a first opening which is aligned with said outlet in said end face of said housing and said first passage extending through said head end portion of said adapter and a second opening which is aligned with said inlet in said end face of said housing and said second passage extending through said head end portion of said adapter.

4. A photoelectric sensor apparatus as set forth in claim 3 wherein said end face of said housing includes an outwardly projecting rib which is disposed between said outlet and said inlet in said housing, said gasket having surface means for defining a recess which receives said rib.

5. A photoelectric sensor apparatus as set forth in claim 1 wherein said first and second passages in said head end portion of said adapter have parallel central axes which are offset from and extend parallel to the central axis of said head end portion of said adapter.

6. A photoelectric sensor apparatus as set forth in claim 1 wherein said connector has an internal thread convolution which engages an external thread convolution on said housing.

7. A photoelectric sensor apparatus as set forth in claim 1 wherein said connector has a surface which abuts said adapter and applies force against said adapter to urge said head end portion of said adapter toward said end face of said housing.

8. A photoelectric sensor apparatus as set forth in claim 1 wherein said housing is at least partially enclosed by said adapter.

9. A photoelectric sensor apparatus comprising a housing enclosing a light source and a photodetector, said housing having an end face with an outlet through which light is conducted from said light source and an inlet through which light is conducted to said photodetector, said housing having first and second side surfaces which extend away from said end face and first and second arcuate sides which extend between said first and second side surfaces, said first and second arcuate sides having surfaces which form spaced apart portions of a plurality of turns of an external thread convolution having an inner diameter and an outer diameter which is larger than said inner diameter, each turn of said plurality of turns of said external thread convolution having a first portion which is disposed on said first arcuate side of said housing and a second portion which is disposed on said second arcuate side of said housing, an adapter in which said housing is at least partially disposed, said adapter having a head end portion which extends across said end face of said housing and first and second legs which extend outward from said head end portion and extend along said first and second side surfaces of said housing, said first leg having a first inner side surface which is disposed in engagement with said first side surface of said housing, said second leg having a second inner side surface which is disposed in engagement with said second side surface of said housing, said first inner side surface on said first leg having a longitudinal axis extending parallel to a longitudinal axis of said first inner side surface on said second leg, said first leg having a first arcuate outer side surface, said second leg having a second arcuate outer side surface, said first leg having a first end portion which projects radially outward of said first arcuate outer side surface, said second leg having a second end portion which projects radially outward of said second arcuate outer side surface, an internally threaded member having an internal thread convolution which engages said first and second portions of said external thread convolution on said housing and which extends across said first arcuate outer side surface on said first leg and extends across said second arcuate outer side surface on said second leg, said internally threaded member having an end surface which applies force against said first end portion of said first leg and against said first end portion of said second leg to urge said head end portion of said adapter toward said end face of said housing, first surface means defining a first passage extending through said head end portion of said adapter, said first passage being axially aligned with said outlet in said end face of said housing, second surface means defining a second passage extending through said head end portion of said adapter, said second passage being axially aligned with said inlet in said end face of said housing, a first fiber optic cable extending into said first passage to conduct light transmitted from said light source through said outlet in said end face of said housing to a location spaced from said housing, and a second fiber optic cable extending into said second passage to conduct light from the location spaced from said housing to said inlet in said end face of said housing and photodetector.

10. A photoelectric sensor apparatus as set forth in claim 9 further including a first retainer disposed in said head end portion of said adapter and engageable with said first fiber optic cable to retain an end portion of said first fiber optic cable in said head end portion of said adapter, and a second retainer disposed in said head end portion of said adapter and engageable with said second fiber optic cable to retain an end portion of said second fiber optic cable in said head end portion of said adapter.

11. A photoelectric sensor apparatus as set forth in claim 9 further including a gasket disposed between said end face of said housing and said head end portion of said adapter, said gasket being resiliently compressed against said end face of said housing by said head end portion of said adapter under the influence of force transmitted from said internally threaded member through said first and second legs to said head end portion of said adapter, said gasket having a first opening which is aligned with said outlet in said end face of said housing and said first passage extending through said head end portion of said adapter and a second opening which is aligned with said inlet in said end face of said housing and said second passage extending through said head end portion of said adapter.

12. A photoelectric sensor apparatus as set forth in claim 11 wherein said end face of said housing includes an outwardly projecting rib which is disposed between said outlet and said inlet in said housing, said gasket having surface means for defining a recess which receives said rib.

13. A photoelectric sensor apparatus as set forth in claim 9 wherein said head end portion of said adapter has a circular end face, said first and second arcuate outer surfaces of said legs having centers of curvature which are disposed on a central axis of said head end portion of said adapter.

14. A photoelectric sensor apparatus as set forth in claim 13 wherein said first and second passages in said head end portion of said adapter have parallel central axes which are offset from and extend parallel to the central axis of said head end portion of said adapter.

* * * * *